United States Patent [19]

Hilber

[11] Patent Number: 5,067,871
[45] Date of Patent: Nov. 26, 1991

[54] PROCEDURE FOR HORIZONTAL STORAGE OF PAPER ROLLS

[75] Inventor: Walter Hilber, Ausburg, Fed. Rep. of Germany

[73] Assignee: Kone Oy, Helsinki, Finland

[21] Appl. No.: 381,349

[22] Filed: Jul. 18, 1989

[30] Foreign Application Priority Data

Jul. 18, 1988 [DE] Fed. Rep. of Germany ....... 3824328

[51] Int. Cl.⁵ ................................................ B65G 1/04
[52] U.S. Cl. .................................. 414/786; 242/68.7; 414/279; 414/433; 414/911; 414/284
[58] Field of Search ............... 414/273, 277, 279, 281, 414/282, 283, 284, 786, 433, 911, 24.6, 621; 242/68.7, 78.7

[56] References Cited

U.S. PATENT DOCUMENTS

| 305,014 | 9/1884 | Mueller | 414/433 X |
|---|---|---|---|
| 947,007 | 1/1910 | Wheat | 242/68.7 |
| 2,730,310 | 1/1956 | Schultz | 242/68.7 X |
| 2,731,213 | 1/1956 | Groll | 242/78.7 |
| 2,766,469 | 10/1956 | Kaye | 414/433 X |
| 2,775,359 | 12/1956 | Carpenter | 414/621 |
| 3,252,609 | 5/1966 | Ellis | 414/621 X |
| 3,325,026 | 6/1967 | Benedick | 414/433 |
| 3,879,019 | 4/1975 | Fulkerson | 414/433 X |
| 3,889,831 | 6/1975 | Davis | 242/68.7 X |
| 3,918,697 | 11/1975 | Gregory | 414/746.7 X |
| 3,920,136 | 11/1975 | Talbert | 242/68.7 X |
| 4,161,253 | 7/1979 | Ralston et al. | 414/24.6 |
| 4,279,559 | 7/1981 | Stumpf | 414/433 X |
| 4,746,076 | 5/1988 | Tomma et al. | 242/68.7 X |
| 4,863,335 | 9/1989 | Herigstad et al. | 414/664 X |
| 4,901,935 | 2/1990 | Reist | 242/68.7 |

FOREIGN PATENT DOCUMENTS

| 8800185 | 5/1989 | Finland | 414/279 |
|---|---|---|---|
| 738326 | 10/1955 | United Kingdom | 414/433 |

Primary Examiner—Frank E. Werner
Assistant Examiner—Scott L. Lowe
Attorney, Agent, or Firm—Sughrue, Mion, Zinn, Macpeak and Seas

[57] ABSTRACT

A procedure to avoid permanent flattening of the roundness of paper rolls. The procedure involves a transport carriage provided with two rotatable supporting shafts and the rolls being rotated through one or more predetermined angles at predetermined intervals of time and then stored further in such new rotational position.

4 Claims, 3 Drawing Sheets

PROCEDURE FOR HORIZONTAL STORAGE OF PAPER ROLLS

BACKGROUND OF THE INVENTION

1. Field of the Invention

The present invention relates to a procedure and a storage shelving assembly for the storage of paper rolls.

2. Description of Related Art

Horizontal storage of paper rolls in a storage shelving assembly is disclosed in German patent applications P 37 41 411.9 and P 38 09 943.8-22. In those applications the paper rolls are deposited directly, i.e. without using pallets, on a bearing surface provided in each shelving corridor between the running tracks for a transport carriage movable into and out of the corridor, in such manner that the roll rests on a segment of its outer layer, said bearing surface having a curved form corresponding to the curvature of the roll surface. As the paper rolls generally needed in the printing trade have a weight of several tons, keeping them stored on a segment of the outer layer may, at least during a longer storage time, lead to an undesirable flattening of the circumference that, during subsequent processing of the paper rolls at high rotational speeds, would result in an undesirable unbalance. To avoid such flattening of the circumference of the paper rolls, the aforementioned German patent applications propose an elastic bearing surface which is elastically deformed under the weight of the paper roll so as to be adapted to its circumferential form.

SUMMARY OF THE INVENTION

An object of the present invention is to achieve a procedure and a storage shelving assembly to avoid the flattening of the circumference of the paper rolls even during long storage times and even in the case of loosely wound rolls.

According to the present invention there is provided a procedure for horizontal storage of paper rolls, in which procedure each of said paper rolls is placed on a bearing surface supporting each said paper roll by a segment of its outer layer and each said paper roll is rotated through one or more predetermined angles about its horizontal axis at one or more predetermined intervals of time and then stored further in its new rotational position.

Also according to the present invention there is provided a storage shelving assembly for horizontal storage of paper rolls, comprising a bearing surface for supporting each of said paper rolls by a segment of its outer layer, provided with an actuator for applying a rotatory force to the circumference of each said paper roll, said actuator purposed to employ time-based control to rotate each said paper roll through one or more predetermined angles, and a bearing surface to permit rotation of each said roll.

The rotation of the rolls is preferably performed in accordance with a program based on certain roll parameters, such as size, weight, material and winding tightness, so as to optimally preserve their roundness even through long storage times.

The paper rolls can be rotated directly on their bearing surface. For this purpose, the bearing surface may be provided with two rotatable supporting shafts laid longitudinally along the circumference of the rolls in the storage corridor, with elastic belts stretched around the shafts to provide a support for the rolls. The paper rolls can be rotated either directly by these shafts or by means of transmission rolls which are moved into and out of the shelving corridor.

A preferable solution in the case of a storage shelving assembly with corridors provided with running tracks for a transport carriage which can be driven into and out of the corridors from a lifting or transporting apparatus moving along the shelving is one in which the paper rolls are rotated on the turntable of the lifting or transporting apparatus. The rolls can be rotated also by the transport carriage. In both of these cases, the storage shelving itself can be of ordinary construction, i.e. the running tracks are connected by a stationary bearing surface that adapts itself to the curvature of the paper rolls. The turntable of the lifting and transporting apparatus has a device for rotating the rolls, onto which device the transport carriage brings a roll from the shelving corridor in order to be rotated. After the rotation the transport carriage transports the roll to another shelving corridor and returns back to the first shelving corridor for the next roll to be rotated. By this procedure it is possible to rotate all the rolls in a shelving corridor.

If the structure of the assembly is such that the rotation of the rolls is made by the transport carriage, the transport carriage has two rotatable supporting shafts constituting a lifting fork, and it is provided with an actuator for applying a rotatory force to the circumference of the paper roll being carried. This rotational actuator preferably engages the supporting shafts, so that the paper rolls can be lifted up from the bearing surface, rotated, transported to a suitable location and deposited again on the bearing surface by these two motor-driven supporting shafts of the transport carriage. If there is only one roll in the shelving corridor, for example the last roll, it is possible by this method to deposit the roll after the rotation onto the same location it was before the rotation.

BRIEF DESCRIPTION OF THE DRAWINGS

Further objects, features and advantages of the invention will become apparent to those skilled in the art from the following description thereof when taken in conjunction with the accompanying drawings, in which.

DESCRIPTION OF THE PREFERRED EMBODIMENTS

Figure 1:
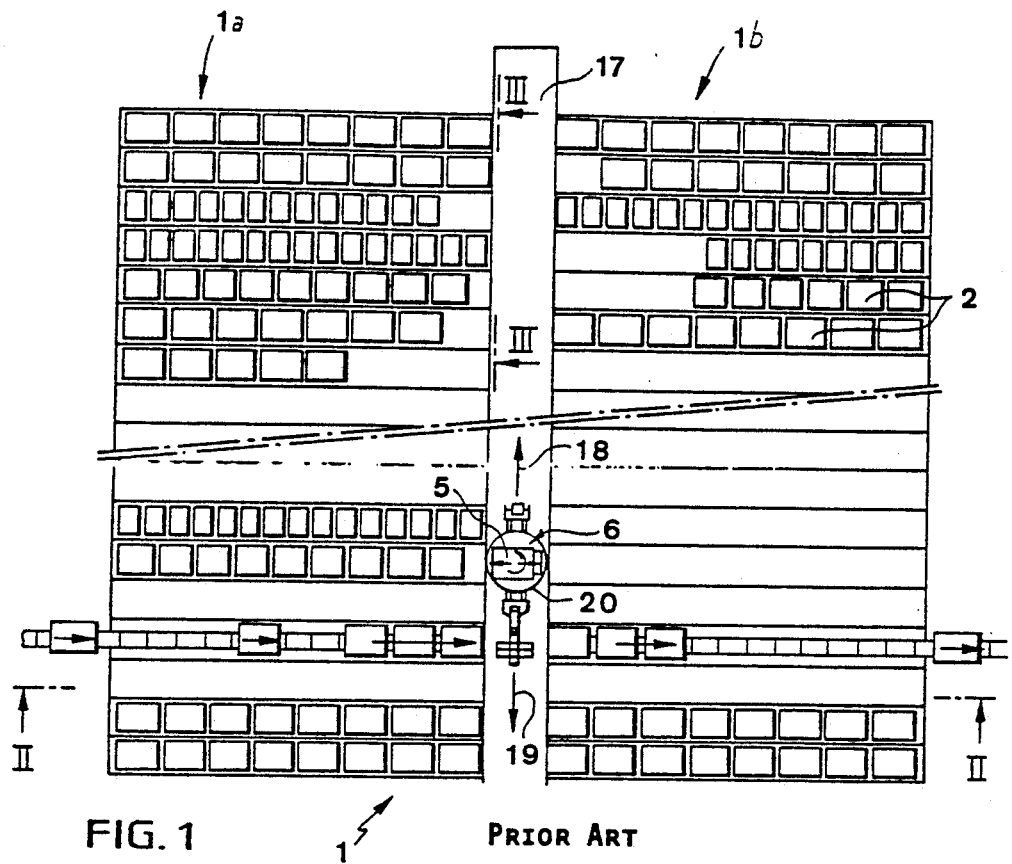
FIG. 1 presents a schematic top view of a storage shelving assembly for horizontal storage of paper rolls.
Figure 2:
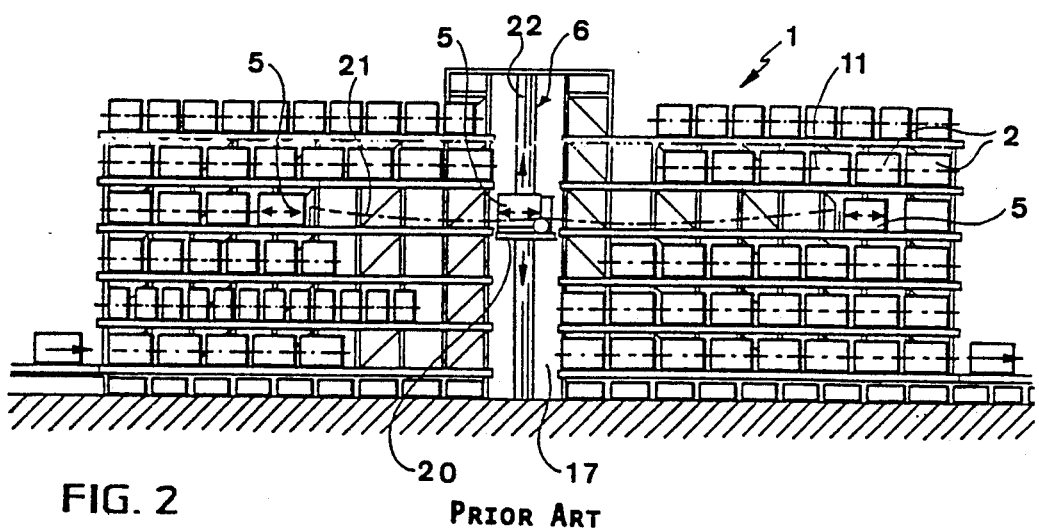
FIG. 2 presents the storage sheving of FIG. 1 as sectioned along the line II—II.

Referring to FIGS. 1 and 2, a storage shelving assembly consists of two shelving blocks 1a and 1b arranged parallel to each other and a passage 17 between the blocks. In the passage 17 is a lifting apparatus 6, which is provided with a turntable 20 and can be moved back and forth in the directions indicated by the arrows 18 and 19. The turntable 20 of the lifting apparatus 6 carries a transport carriage 5, which, upon reaching the level of a given corridor in the shelving, can move independently into the corridor e.g. to location 5' or 5''. The required energy may, for example, be supplied to the transport carriage via a cable provided in the lifting apparatus 6. The turntable 20 of the lifting apparatus 6 may also be vertically movable along a girder 22. All these movements of the transport carriage 5 and the lifting apparatus 6 may be controlled in a known manner by a means of central control unit.

Figure 3:
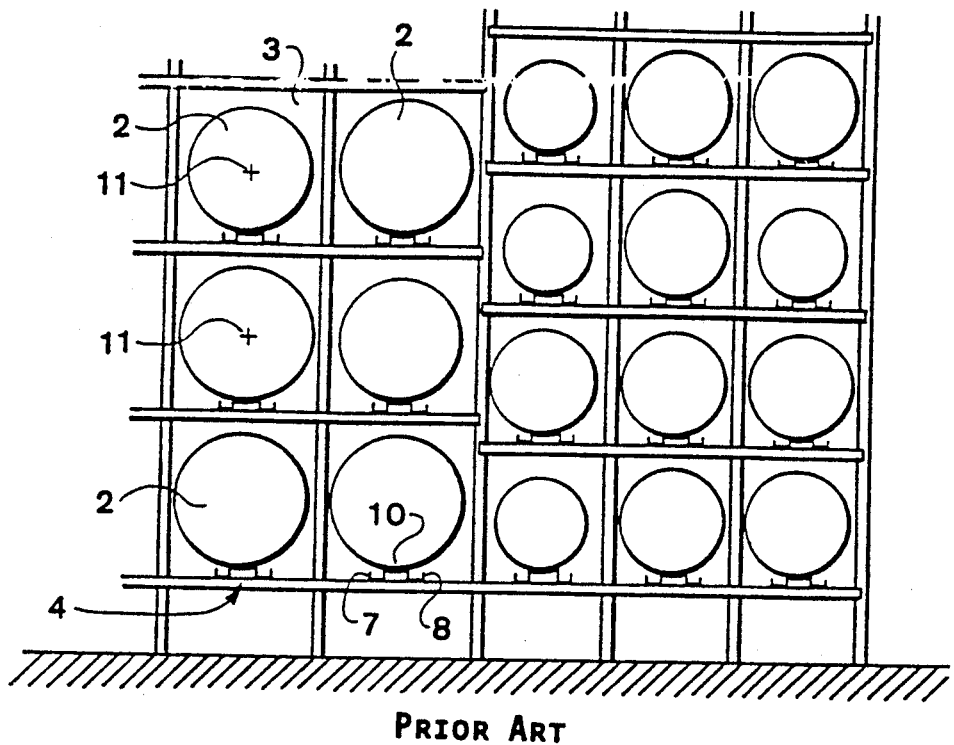
FIG. 3 presents a magnified view of the partial section III—III in FIG. 1.
Figure 4:
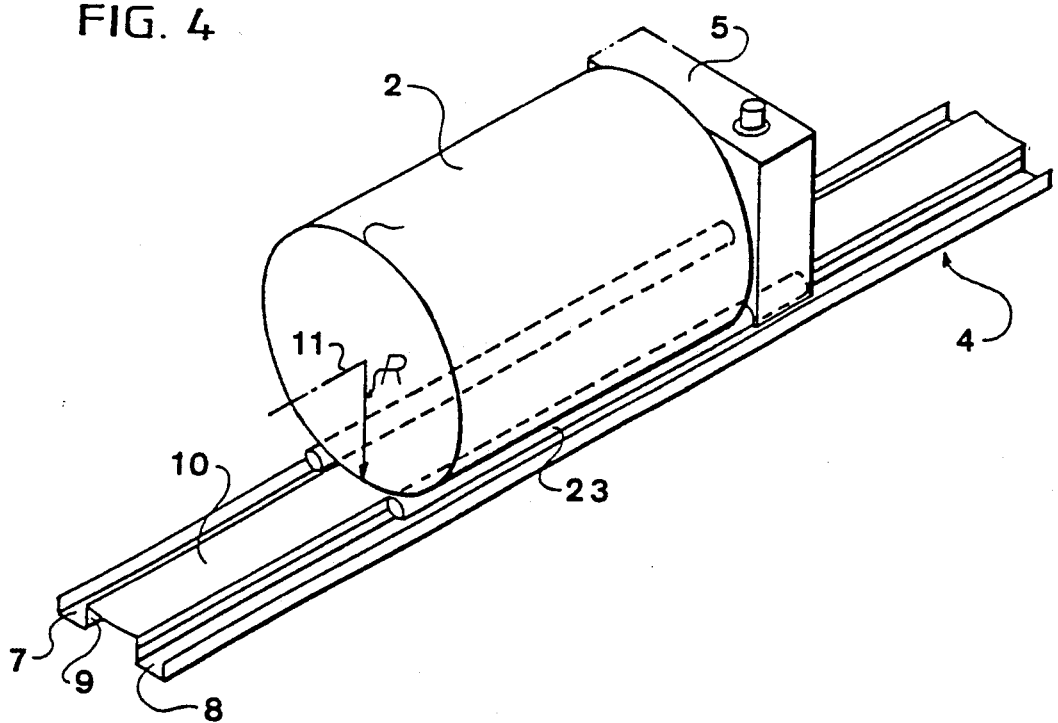
FIG. 4 presents a still more magnified view of a running track in a shelving corridor as shown in the partial section in FIG. 3, with a transport carriage implemented as provided by the invention.

As illustrated by FIGS. 3 and 4, the paper rolls, the placement of which in the shelving blocks 1a and 1b is shown in FIGS. 1 and 2, are shown as deposited in the shelving corridors 3 in a horizontal position, i.e. their winding axes 11 runs parallel to the roll seats 10 of the storage corridors 3 and to the running tracks 4, laid on either side of the roll seats 10 in each corridor to guide the transport carriage 5. The roll seats 10 constitute an elastically deformable bearing surface with a curvature adapted to the circumference 27 of the paper rolls 2. As shown, the running tracks 4 are U-profiles 7 and 8, in each of which the inner side wall 9, i.e. the side facing the other profile, constitutes an elastically deformable support for the roll seat 10.

As illustrated by FIG. 4, the transport carriage 5 is provided with a lifting fork 23, whose arms move along the U-profiles 7,8 of the running track 4. The lifting fork 23 consists of two supporting shafts rotatable, for example, by a motor, so that the paper roll 2, after being lifted up from the seat, can be rotated through a given angle by rotating said shafts, and deposited again on the seat. In practice there is often more than one roll in the shelving corridor. For this reason the transport carriage 5 often has to transport the roll to another place after the rotation in order to be able to rotate the next roll in the same shelving corridor. Only the last roll in the shelving corridor or otherwise the only roll in the corridor can be rotated in its place without carrying it to another place.

The most advantageous solution is such that the rotation machinery for the rolls is located on the turntable 20 of the lifting apparatus 6. In this case the transport carriage 5 equipped with a simple lifting fork brings the roll from the shelving corridor onto the turntable 20, where the roll is rotated by the rotation machinery, and whereafter the roll is carried to another shelving corridor by the transport carriage 5.

It is also possible to construct the shelving assembly so that there is a rail for a special transport carriage over the shelving corridor. The special transport carriage can move over the rolls without any hindrance. This carriage has a rotation and transportation device that can be lowered down in order to pick up any roll from the seat. The roll can then be rotated and lowered back to its original location. The advantage of this embodiment is easy handling of all rolls.

Figure 5:
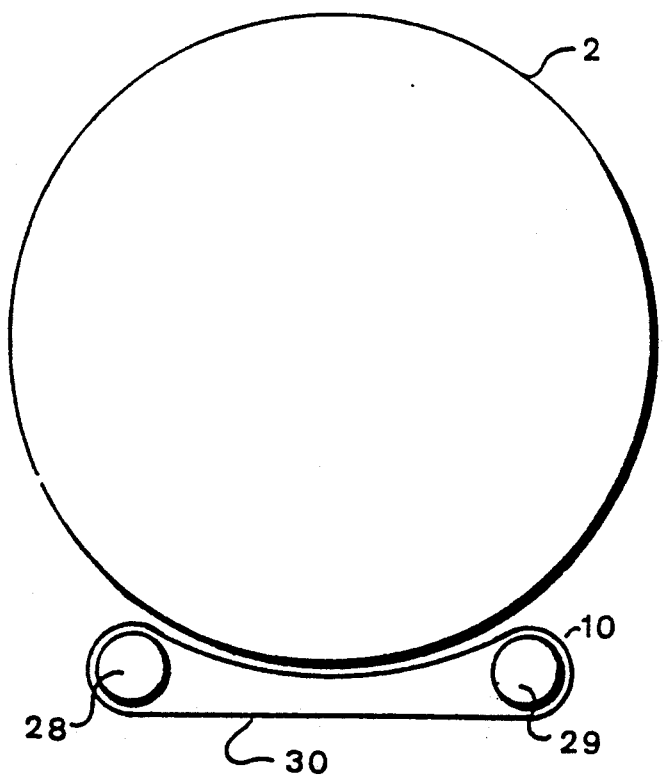
FIG. 5 presents a cross-sectinal view of a roll support according to one embodiment of the present invention.

Referring now to FIG. 5, the roll 2 is supported by a segment of its outer layer by means of support and rotating belt 30. Belt 30 is in turn supported by support shafts 28 and 29, which are fastened to the shelving assembly. Rotation of the roll can be effected by the rotation of either support shaft 28 or 29 which in turn causes belt 30 to move in turn causing the roll 2 to rotate.

I claim:

1. A procedure for the horizontal storage of paper rolls in a storage shelving assembly, comprising the steps of:

individually placing and then horizontally storing each of said paper rolls on a first bearing surface (30) which deforms to accommodate the arcuate outer layer of the roll and which supports each said paper roll throughout the length thereof by a segment of the outer layer of each roll;

rotating each said paper roll through one or more predetermined angles about a horizontal winding axis thereof at one or more predetermined intervals of time, by moving said first bearing surface; and further storing each of said paper rolls in its newly rotated position.

2. A procedure for the horizontal storage of paper rolls in a storage shelving assembly, comprising the steps of:

individually placing and then horizontally storing each of said paper rolls on a first bearing surface (10) which deforms to accommodate the arcuate outer layer of the roll and which supports each said paper roll throughout the length thereof by a segment of the outer layer of each roll; and, at one or more predetermined intervals of time, lifting each said paper roll from said first bearing surface by second bearing surfaces (23);

rotating each said paper roll through one or more predetermined angles about a horizontal winding axis thereof by rotating said second bearing surfaces;

lowering each said paper roll from said second bearing surfaces to said first bearing surface; and further storing each of said paper rolls in its newly rotated position.

3. A procedure according to claim 2, wherein a rotated roll is further stored at an original location thereof.

4. A procedure according to claim 2, wherein a rotated roll is further stored at a new location.

* * * * *